(12) United States Patent  
Sun

(10) Patent No.: US 7,420,995 B2  
(45) Date of Patent: Sep. 2, 2008

(54) SIMULTANEOUSLY MODE-LOCKED, Q-SWITCHED LASER

(75) Inventor: Yunlong Sun, Beaverton, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 0 days.

(21) Appl. No.: 11/567,150

(22) Filed: Dec. 5, 2006

(65) Prior Publication Data

US 2007/0133627 A1 Jun. 14, 2007

Related U.S. Application Data

(60) Provisional application No. 60/742,980, filed on Dec. 6, 2005.

(51) Int. Cl.  
*H01S 3/11* (2006.01)

(52) U.S. Cl. .......................................... 372/10; 372/18
(58) Field of Classification Search ................... 372/10, 372/18  
See application file for complete search history.

(56) References Cited

U.S. PATENT DOCUMENTS

2002/0009843 A1* 1/2002 Kyusho et al. .............. 438/200  
2006/0187975 A1* 8/2006 Koroshetz et al. ............. 372/10

* cited by examiner

*Primary Examiner*—Dung T Nguyen  
(74) *Attorney, Agent, or Firm*—Stoel Rives LLP

(57) ABSTRACT

A simultaneously mode-locked, Q-switched laser is configured to prevent loss of mode lock during laser operation. A preferred embodiment prevents loss of mode lock by operating the laser between the Q-switched pulses with a residual level of laser power sufficient to maintain a mode-locked state. The residual laser power output can be blocked by a pulse picking device.

12 Claims, 5 Drawing Sheets

SIMULTANEOUSLY MODE-LOCKED, Q-SWITCHED LASER

RELATED APPLICATION

This application claims benefit of U.S. Provisional Patent Application No. 60/742,980, filed Dec. 6, 2005.

COPYRIGHT NOTICE

©2006 Electro Scientific Industries, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71 (d).

TECHNICAL FIELD

This invention relates to a simultaneously mode-locked, Q-switched laser that is configured to prevent loss of mode lock during laser operation.

BACKGROUND INFORMATION

Material processing with use of an ultra-fast laser (i.e., laser output having pulse widths of less than 20 ps) or a mode-locked laser having laser output pulse widths shorter than 1 ns is currently a popular topic for discussion among industry practitioners. A typical commercially available ultra-fast laser is capable of a laser pulse repetition rate of 1-5 KHz, with 1-5 mJ laser energy per pulse. FIG. 1A shows the building block components of a typical prior art ultra-fast laser system 10. FIG. 1B shows typical laser pulse waveforms produced at the outputs of different components of system 10. The first part of ultra-fast laser system 10 is a typical mode-locked laser 12. Constructed with proper lasing materials and mode locking techniques, mode-locked laser 12 emits laser output pulse power characterized by a pulse width of 100 fs-20 ps and pulse repetition rate of 80-100 MHz. A laser pulse picking device 14 selects 1-5 KHz mode-locked laser pulses from the 80-100 MHz mode-locked laser pulse train for amplification. FIG. 1B, lines A and B, show the pulse trains at the outputs of mode-locked laser 12 and pulse picking device 14, respectively. Risk of damage to any optical components by the amplified intense ultra-fast laser pulses is avoided by introducing at the output of pulse picking device 14 a pulse stretcher 16 that stretches the femtosecond-wide laser pulses to reduce their peak intensity before delivery to a regenerative amplifier 18. After amplification, the amplified stretched pulses are directed to a pulse compressor 20, which restores them to the desired femtosecond pulse width range. FIG. 1B, line C, shows the amplified output of pulse compressor 20. Laser system 10 is very complex, very expensive, and difficult to use in an industry environment. Moreover, the laser pulse repetition rate is too low for many laser processing applications.

On the other hand, a typical mode-locked laser has a laser pulse repetition rate of 80-100 MHz (depending on the resonator length) with a relatively very low laser energy per pulse (in the range of less than 1 µJ). FIG. 2A shows a prior art mode-locked laser system 30 composed of a mode-locked laser 32 emitting laser output that has a pulse width in a range of between one picosecond and several tens of picoseconds and is directed to an optional pulse picking device 34, which is followed by an optional amplifier 36. FIG. 2B, lines A, B, and C, show typical laser pulse power waveforms produced at the outputs of mode-locked laser 32, pulse picking device 34, and amplifier 36, respectively. A mode-locked laser system 30 has recently become available, such as a Time-Bandwidth Products, Inc. Duetto model laser, and exhibits typical laser repetition rate of 100 KHz at an average power of about 10 W. There are several performance, packaging, and operational problems associated with this kind of laser system. First, since the pulse repetition rate of mode-locked laser 32 is as high as 100 MHz but the pulse repetition rate of pulse picking device 34 is only 100 KHz, most (99.9 percent) of the laser energy emitted by mode-locked laser 32 is wasted. The laser energy per pulse for mode-locked laser 32 is too low, which places very stringent gain requirements on amplifier 36. Second, the design and structure of laser system 30 are very complex. Third, because of such complexity, laser system 30 is not yet ready for widespread industrial application.

A simultaneously mode-locked, Q-switched laser system is constructed with a Q-switch placed in the resonator of a mode-locked laser to control its laser pulse repetition rate. The laser output pulse emitted from the mode-locked laser is a higher laser energy pulse because of Q-switch operation. FIG. 3A shows a prior art simultaneously mode-locked, Q-switched laser system 40 composed of a Q-switched, mode-locked laser 42, together with an optional pulse picking device 44, and an amplifier 46. FIG. 3B, lines A, B, and C, show typical laser pulse power waveforms produced at the outputs of mode-locked, Q-switched laser 42, pulse picking device 44, and amplifier 46, respectively. FIG. 3B, line C, shows the output pulse waveform of laser system 40, which waveform is characterized by multiple mode-locked laser pulses 48 under a nanosecond-wide Q-switched laser pulse power profile 50. Pulse power profile 50 of laser pulses 48 is advantageous for many laser processes, such as, for example, semiconductor memory link processing, material trimming, and via formation. The number of mode-locked laser pulses 48 within the nanosecond-wide pulse power profile 50 can be controlled by the Q-switching operation or selected with an optional pulse picking device 44 for best processing results. The short time interval between next adjacent ones of multiple mode-locked pulses 48 is advantageous for many laser material processes for reducing debris and increasing throughput. The laser energy of each mode-locked laser pulse 48 can be increased by use of an optional amplifier 46. One potential technical difficulty for this Q-switched and mode-locked laser is that mode locking cannot be ideally established during the short time of Q-switched laser pulse buildup. This is the reason why mode-locked lasers are mostly continuous-wave pumped and operated in a continuous mode, i.e., to provide sufficient time to establish mode locking or to not interrupt mode locking during operation.

SUMMARY OF THE DISCLOSURE

A simultaneously mode-locked, Q-switched laser structured to perform certain material laser processes delivers a typical nanosecond-wide laser pulse power profile similar to the laser pulse power profile achieved by traditional Q-switched lasers. Instead of continuous laser power within the profile, there are multiple mode-locked short pulses within the nanosecond-wide laser pulse power profile. A preferred embodiment accomplishes this by operating the laser between the Q-switched pulses with a level of residual continuous power to maintain a mode-locked state. If necessary, the residual continuous laser output can be blocked by a pulse picking device.

There are several advantages stemming from construction of a laser of this kind for certain material processing applications. First, since the laser is Q-switched while mode-locked, the energy in the delivered mode-locked laser pulses that are located near the peak of the Q-switched pulse profile peak is at least 10 times higher than that of the traditional mode-locked laser. Second, in certain designs, when the entire nanosecond laser power profile is used for material processing, there is no longer a need for a pulse picking device, the elimination of which simplifies the laser structure. Third, there are less demanding requirements for an output amplifier, if it is needed. Fourth, a pulse picking device can still be used if the number of mode-locked pulses under the nanosecond-wide laser pulse power profile needs to be controlled or selected, or the residual laser power in between the Q-switched laser pulses needs to be totally eliminated. Fifth, for certain material processing applications with lasers, such as, for example, semiconductor wafer singulation or low-K layer dicing, using a nanosecond-wide laser pulse power profile within which there are multiple mode-locked laser pulses is advantageous in cleaning the kerf and reducing debris. There is also an overall advantage in increasing laser processing throughput.

Additional aspects and advantages will be apparent from the following detailed description of preferred embodiments, which proceeds with reference to the accompanying drawings.

DETAILED DESCRIPTION OF PREFERRED EMBODIMENTS

Figure 4:
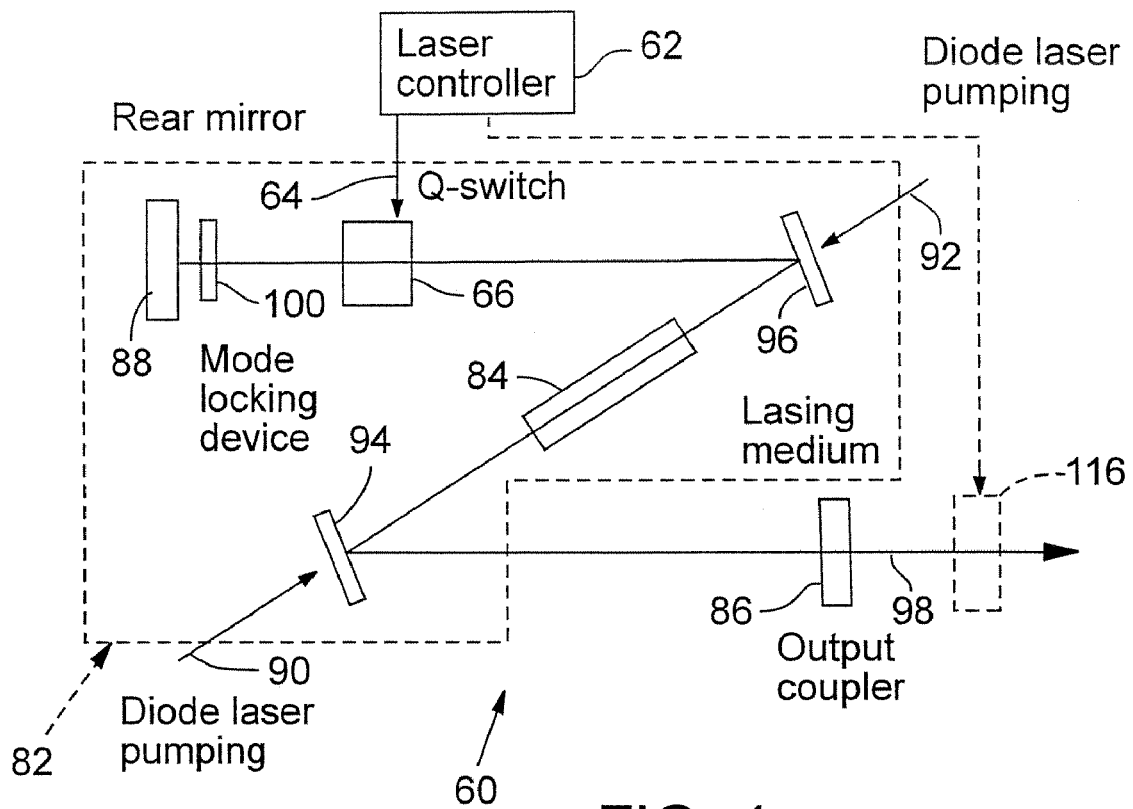
FIG. 4 shows a preferred mode-locked, Q-switched laser that is configured to prevent loss of mode lock during laser operation.

FIG. 4 shows a preferred mode-locked, Q-switched laser 60 that is configured to prevent loss of mode lock during laser operation. Laser 60 receives from a laser controller 62 a Q-switch drive signal 64 that delivers to a Q-switch 66 a level of continuous-wave (CW) RF energy to maintain residual laser operation between Q-switched pulses. (Skilled persons will appreciate that laser controller 62 can operate laser 60 in a quasi-CW mode by, for example, repeatedly switching between 1 ms emission output states and 1 ms nonemission output states.) Laser 60 includes a laser resonator 82 that contains a lasing medium 84 and Q-switch 66 positioned between a partly reflective output coupler 86 and a rear mirror 88. Laser 60 is end-pumped by diode lasers 90 and 92 emitting light incident on respective fold mirrors 94 and 96, the latter of which positioned between Q-switch 66 and lasing medium 84. Fold mirror 96 reflects light to fold mirror 94 and to output coupler 86, through which a laser output 98 propagates. A semiconductor saturable absorber mirror device 100 positioned next adjacent to rear mirror 88 within laser resonator 82 cooperates with lasing medium 84 to establish mode-locked operation of laser 60.

Figure 5:
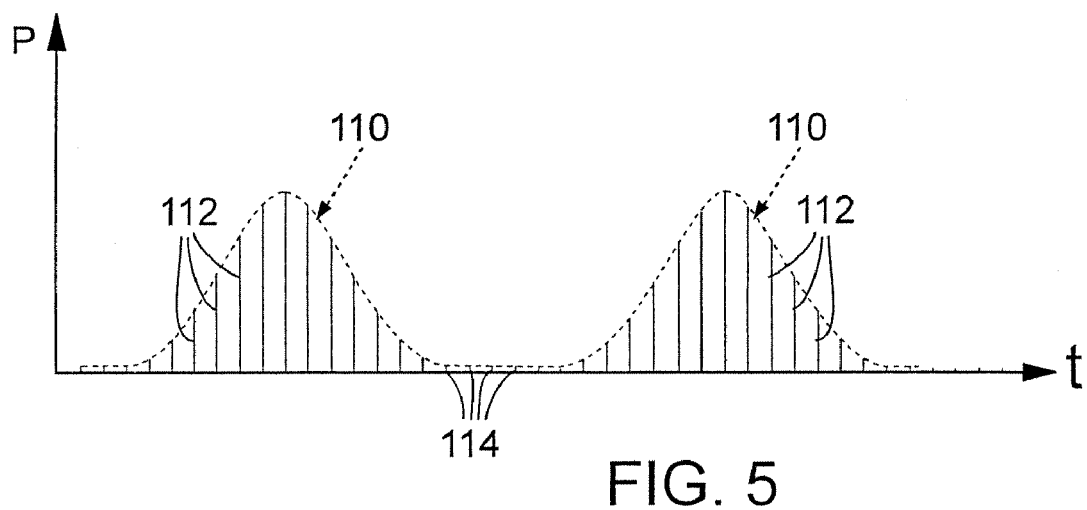
FIG. 5 shows the Q-switched laser output pulse power profile of the laser of FIG. 4.

The operation of laser 60 is described with reference to FIG. 5, which shows the Q-switched laser pulse power profile of laser output 98. Q-switch 66 changes the Q value of laser resonator 82 in response to Q-switch drive signal 64 by selectively producing high and low Q states of laser resonator 82. The high Q state causes production of multiple time-displaced light pulse emission bursts 110 of one or more mode-locked processing pulses 112, and the low Q state causes production of very low intensity mode-locked laser pulses 114 between adjacent light emission bursts 110. Very low intensity represents less than about 1% of the peak power of processing pulses 112. Very low intensity mode-locked laser pulses 114 maintain for laser output 98 a mode-locked condition between times of light emission buildup in the high Q state of laser resonator 82.

Figure 1A:
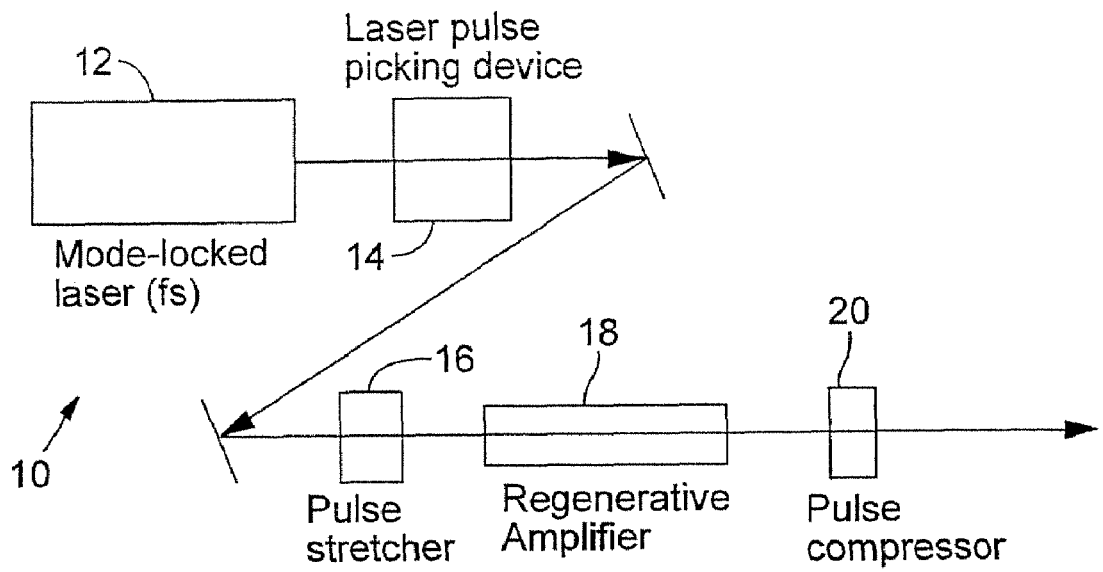
FIGS. 1A and 1B show, respectively, a typical prior art ultra-fast laser system and the laser pulse power waveforms produced at the outputs of its components.
Figure 1B:
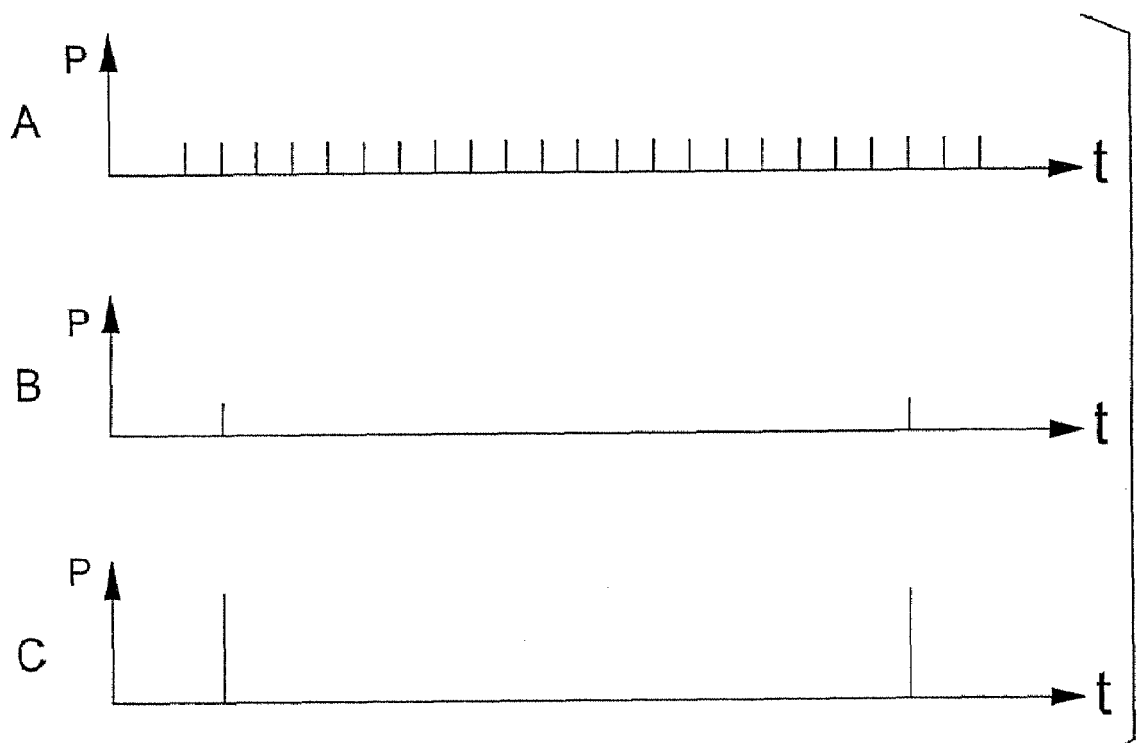
Figure 2A:
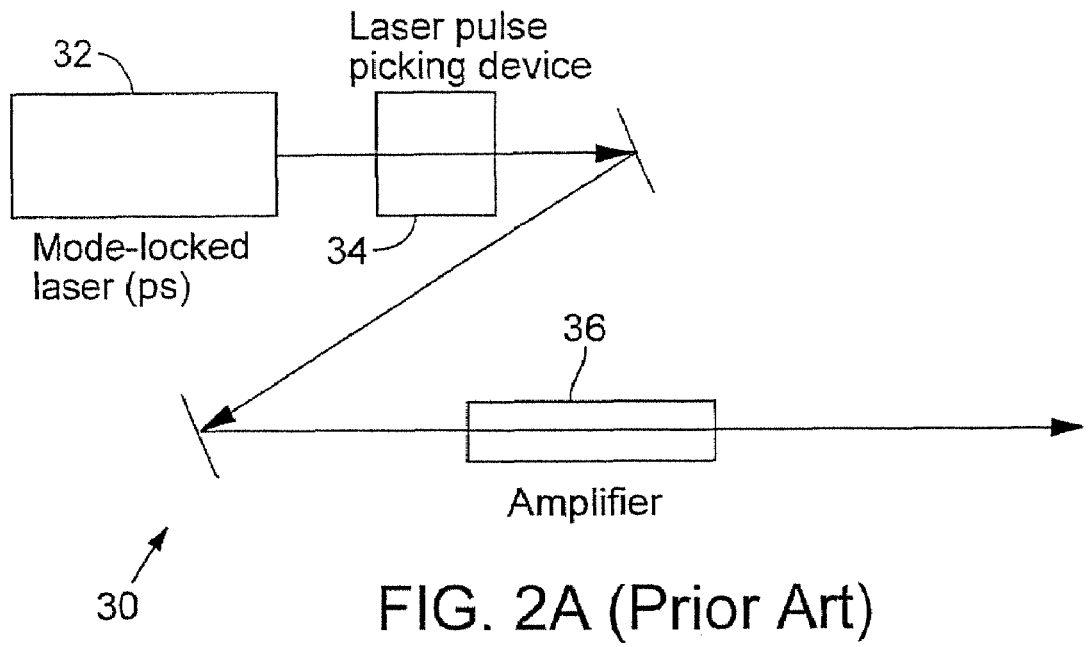
FIGS. 2A and 2B show, respectively, a typical prior art mode-locked laser system and the laser pulse power waveforms produced at the outputs of its components.
Figure 2B:
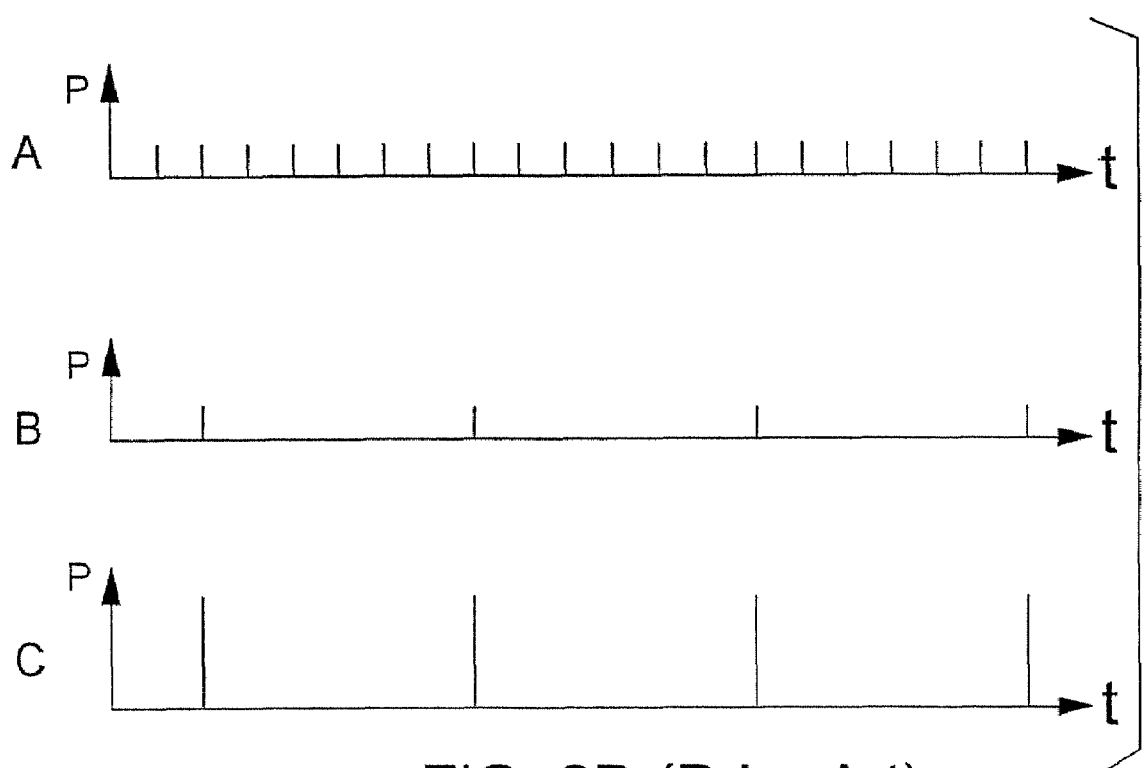
Figure 3A:
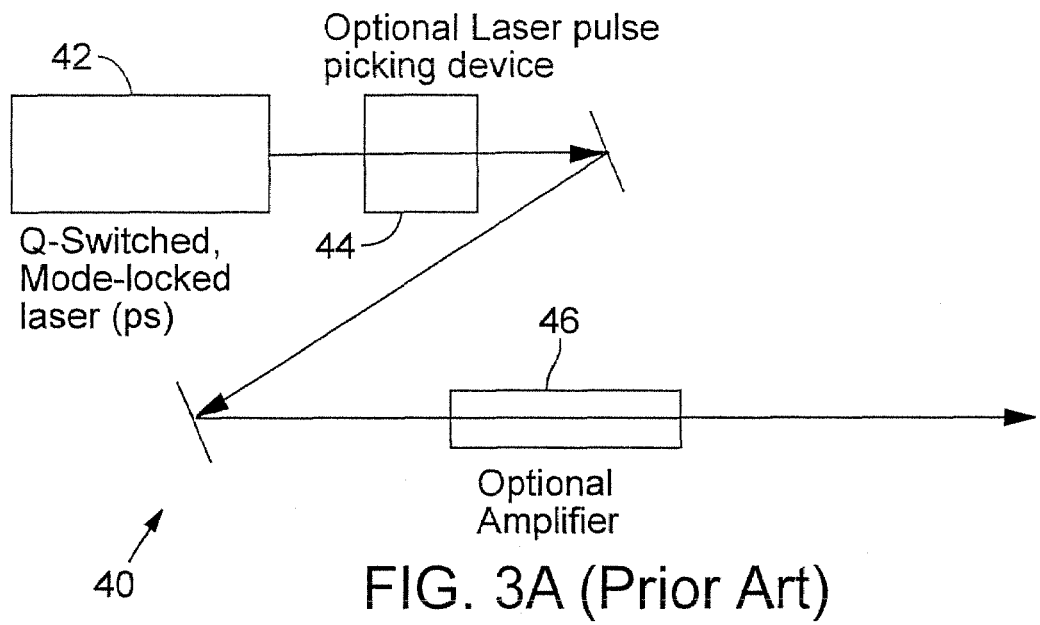
FIGS. 3A and 3B show, respectively, a prior art simultaneously mode-locked, Q-switched laser system and the laser pulse power waveforms produced at the outputs of its components.
Figure 3B:
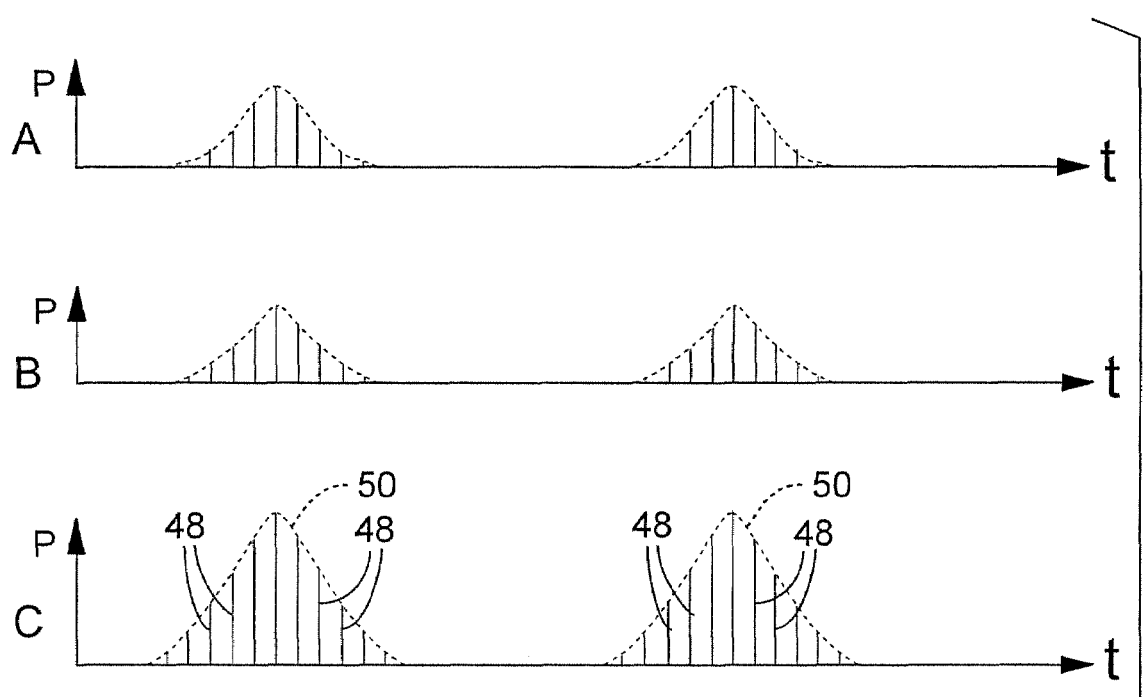

Very low intensity mode-locked laser pulses 114 in the form of residual laser output can be blocked by a pulse picking device 116, which is shown in phantom lines in FIG. 4. Laser controller 62 coordinates the operations of Q-switch 66 and laser pulse picking device 116 to select multiple time-displaced light pulse emission bursts 110 from very low intensity mode-locked laser pulses 114. Pulse picking device 116 can be used also to select a desired number of mode-locked laser pulses 112 from one or more of light pulse emission bursts 110. An amplifier (not shown in FIG. 5 but analogous to amplifier 46 in FIG. 3A) can be used to amplify the light pulse emission bursts 110 or mode-locked laser pulses 112 delivered at the output of pulse picking device 116. The effect of using Q-switch signal 64 to maintain mode lock results in reduction of the intensity of the Q-switched laser pulse power profile. Such a reduction in pulse profile power is of minimal consequence as long as the peak power can be increased by a factor of 2-10 over that achievable with a traditional mode-locked laser.

Figure 6:
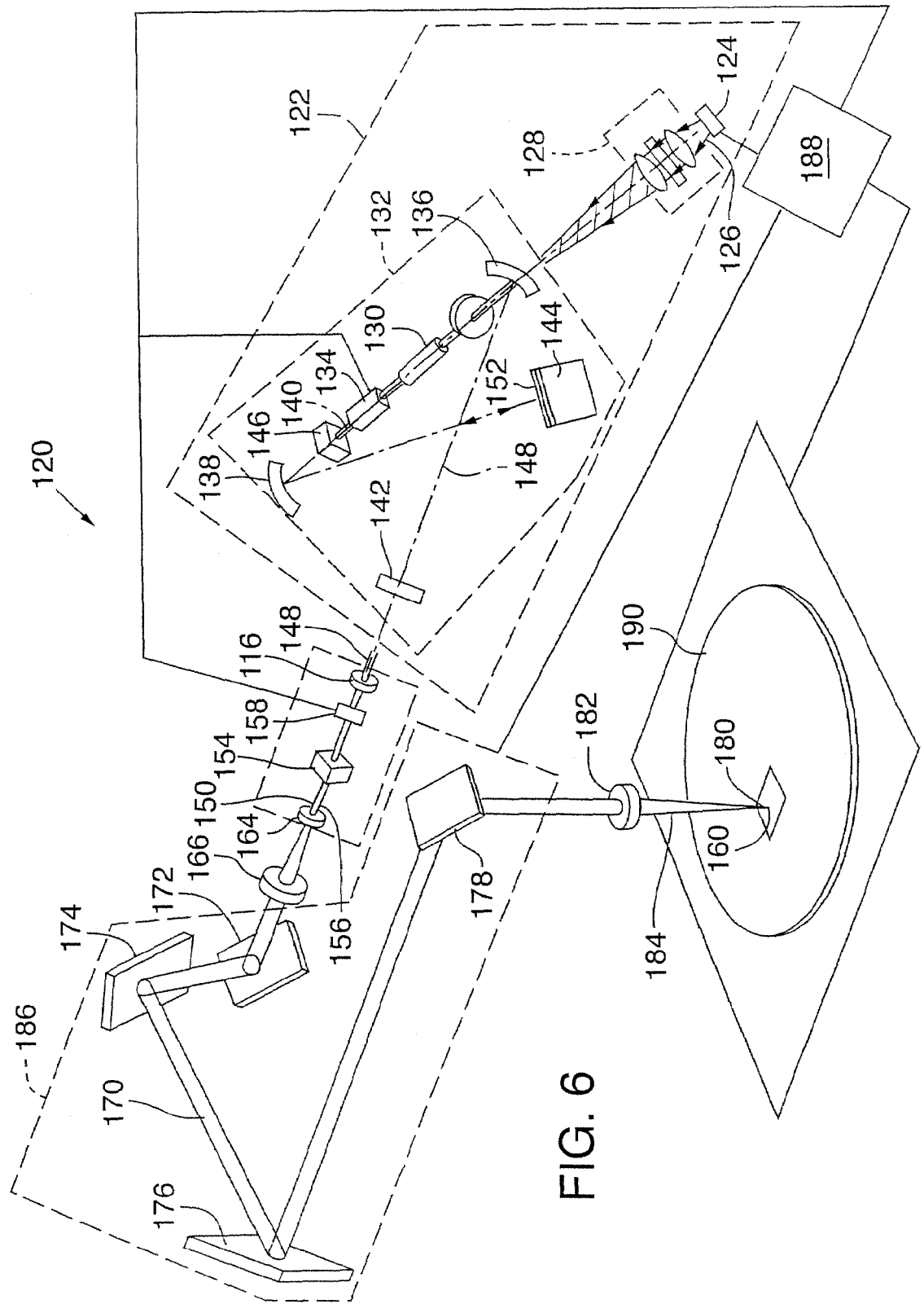
FIG. 6 shows a preferred embodiment of a mode-locked, Q-switched laser system configured to prevent loss of lock during generation of sets of mode-locked laser pulses for severing semiconductor device links.

FIG. 6 shows in greater detail a preferred embodiment of a simplified laser system 120 including a mode-locked, Q-switched laser 122 for generating light emission bursts 110 of mode-locked laser pulses 112 that are desirable for achieving semiconductor device link severing. Preferred laser wavelengths from about 150 nm to about 2000 nm include, but are not limited to, 1.3, 1.064, or 1.047, 1.03-1.05, 0.75-0.85 µm or their second, third, fourth, or fifth harmonics from Nd:YAG, Nd:YLF, Nd:YVO4, Yb:YAG, or Ti:Sapphire lasers 122. Skilled persons will appreciate that lasers emitting at other suitable wavelengths are commercially available, including fiber lasers, could be employed.

Laser system 120 is modeled herein only by way of example to a second harmonic (532 nm) Nd:YAG laser 122, since the frequency doubling elements can be removed to eliminate the harmonic conversion. The Nd:YAG or other solid-state laser 122 is pumped by a laser diode 124 or a laser diode-pumped solid-state laser, the emission 126 of which is focused by lens components 128 into a lasing medium 130 within a laser resonator 132. Laser resonator 132 includes, in addition to lasing medium 130, a Q-switch 134 positioned between focusing/folding mirrors 136 and 138 along an optic axis 140, an output coupler 142, and a rear mirror 144. An aperture 146 may also be positioned between lasing medium 130 and mirror 138. Mirror 136 reflects light to mirror 138 and to partly reflective output coupler 142 that enables propagation of laser output 148 along an optic axis 150. Mirror 138 is adapted to reflect the light to a semiconductor saturable absorber mirror device 152 and rear mirror 144 of resonator 132 for mode locking laser 122. A harmonic conversion doubler 154 is preferably placed externally of resonator 132 to convert the laser beam frequency to the second harmonic laser output 156. Skilled persons will appreciate that where harmonic conversion is employed, a gating device 158, such as an E-O or A-O device can be positioned before the harmonic conversion apparatus to gate or finely control the harmonic laser pulse energy. Pulse picking device 116 (FIG. 5) can either be a focusing optics or a waveplate for purpose of harmonic generation in laser system 120.

Skilled persons will also appreciate that any of the second, third, or fourth harmonics of Nd:YAG (532 nm, 355 nm, 266 nm); Nd:YLF (524 nm, 349 nm, 262 nm) or the second harmonic of Ti:Sapphire (375-425 nm) can be employed to preferably process certain types of semiconductor device links 160 and/or passivation layers using appropriate well-known harmonic conversion techniques. Harmonic conversion processes are described in pp.138-141, V. G. Dmitriev, et al., "Handbook of Nonlinear Optical Crystals", Springer-Verlag, New York, 1991 ISBN 3 540-53547-0.

Spectra Physics makes a Ti-Sapphire ultra fast laser called the MAI TAI™ that provides ultrashort pulses 112, each having a pulse width of 150 femtoseconds (fs) at 1 W of power in the 750 to 850 nm range, at a repetition rate of 80 MHz. An exemplary laser 122 can be one based on the MAI TAI™ laser with addition of an A-O Q-switch and proper modification on its driving electronics, according to the invention. This laser 122 is pumped by a diode-pumped, frequency-doubled, solid-state green YAG laser (5 W or 10 W). Other exemplary ultrafast Nd:YAG or Nd:YLF lasers on which the invention can be built to make laser 122 include the JAGUAR-QCW-1000™ and the JAGUAR-CW-250™ sold by Time-Bandwidth Products, Inc., of Zurich, Switzerland.

Laser output 156 (regardless of wavelength or laser type) can be manipulated by a variety of conventional optical components 164 and 166 that are positioned along a beam path 170. Components 164 and 166 may include a beam expander or other laser optical components to collimate laser output 156 to produce a beam with useful propagation characteristics. One or more beam reflecting mirrors 172, 174, 176, and 178 are optionally employed and are highly reflective at the laser wavelength desired but highly transmissive at the unused wavelengths, so only the desired laser wavelength will reach a link structure 180. A focusing lens 182 preferably employs an F1, F2, or F3 single component or multicomponent lens system that focuses the collimated pulsed laser system output 184 to produce a focused spot size that is greater than the link width, encompasses it, and is preferably less than 2 µm in diameter or smaller depending on the width of link 160 and the laser wavelength.

A preferred beam positioning system 186 is described in detail in U.S. Pat. No. 4,532,402 of Overbeck. Beam positioning system 186 preferably employs a laser controller 188 that controls at least two platforms or stages (stacked or split-axis) and coordinates with reflectors 172, 174, 176, and 178 to target and focus laser system output 182 to a desired link 158 on an IC device or work piece 190. Beam positioning system 184 permits quick movement between links 160 on work piece 190 to effect unique link-severing operations on-the-fly based on provided test or design data.

It will be obvious to those having skill in the art that many changes may be made to the details of the above-described embodiments without departing from the underlying principles of the invention. The scope of the present invention should, therefore, be determined only by the following claims.

The invention claimed is:

1. A simultaneously mode-locked, Q-switched laser producing laser output characterized in part by multiple time-displaced laser light pulse emission bursts, each of which including one or more mode-locked output pulses, comprising:

a pumping source optically associated with a lasing medium residing in a laser resonator characterized by a Q value, the pumping source providing pumping light to stimulate a lasing gain of the lasing medium;

a mode-locking device optically associated with the lasing medium and the laser resonator to establish laser light emission in a mode-locked state; and a Q-switch positioned within the laser resonator and operating to change the Q value of the laser resonator in response to a Q-switch drive signal selectively producing high and low Q states of the laser resonator, the high Q state causing production of the multiple time-displaced laser light pulse emission bursts of one or more mode-locked output pulses and the low Q state causing production of very low intensity mode-locked laser pulses between adjacent ones of the multiple time-displaced laser light pulse emission bursts to maintain for the laser output a mode-locked condition between the laser light pulse emission bursts.

2. The laser of claim 1, further comprising a laser pulse picking device receiving the laser output and a laser controller contributing to production of the Q-switch drive signal, the laser controller coordinating the operations of the Q-switch and the laser pulse picking device to select the multiple time-displaced laser light pulse emission bursts from the very low intensity mode-locked laser pulses.

3. The laser of claim 2, further comprising a semiconductor memory device link structure target on which a processing laser output derived from the laser output is incident.

4. The laser of claim 1, further comprising a laser pulse picking device receiving the laser output and a laser controller contributing to production of the Q-switch drive signal, the laser controller coordinating the operations of the Q-switch and the laser pulse picking device to select a desired number of the multiple time-displaced laser light pulse emission bursts.

5. The laser of claim 4, further comprising a semiconductor memory device link structure target on which a processing laser output derived from the laser output is incident.

6. The laser of claim 4, further comprising an amplifier to amplify the desired number of laser light pulse emission bursts selected.

7. The laser of claim 1, further comprising a laser pulse picking device receiving the laser output and a laser controller contributing to production of the Q-switch drive signal, the laser controller coordinating the operations of the Q-switch and the laser pulse picking device to select a desired number of mode-locked output pulses from one or more of the laser light pulse emission bursts.

8. The laser of claim 7, further comprising an amplifier to amplify the desired number of mode-locked output pulses selected.

9. The laser of claim 1, further comprising a silicon substrate target on which a processing laser output derived from the laser output is incident.

10. The laser of claim 1, in which a processing laser output derived from the laser output is directed to a target specimen comprised of a low-K layer to effect low-K layer dicing.

11. The laser of claim 1, in which a processing laser output derived from the laser output is directed to a target specimen to form a via in it.

12. The laser of claim 1, in which the pumping light is of a continuous-wave type.

* * * * *